United States Patent Office.

JOHN D. GRÜNEBERG, OF SPRING MILLS, NEW JERSEY.

Letters Patent No. 71,479, dated November 26, 1867.

IMPROVED ALLOYS FOR MAKING PLATES AND SHEETS.

*The Schedule referred to in these Letters Patent and making part of the same.*

TO ALL WHOM IT MAY CONCERN:

Be it known that I, JOHN DANIEL GRÜNEBERG, of Spring Mills, in the county of Camden, and State of New Jersey, have invented a new and improved Article of Metal; and I do hereby declare the following to be a clear and exact description of the nature thereof, sufficient to enable others skilled in the art to which my invention appertains to fully understand and make the same.

My invention consists of an article of plated metal, an alloy, and also an alloy plated with an alloy, which are substitutes for the purest tin in quality, composition or texture, and utility, and produced at a much less expense.

In carrying out my invention—

First, I cast a block of lead, in a mould of suitable size, and pass it through a pair of highly-polished rollers. I now make an alloy of either of the following: one quarter tin, one quarter copper, and one half of lead, more or less; or six parts tin, one antimony; or fifty parts tin, four antimony, one bismuth; or fourteen parts tin, one twenty-eighth part zinc or copper, or one half of each of the latter ones; or pure tin, and alloy it with as much of one of the above-named metals so as only to give the tin more stiffness and durability than it has in its natural state, or I alloy it with any other metal, substantially the same, producing the same result. A block of either of these alloys is now cast in a mould of suitable size, which block is then passed through highly-polished iron rollers, so as to be reduced to a proper thickness to answer the purpose of common plating. The thickness may vary from one to thirty-five per cent. of the original thickness of the aforementioned block of lead. One of the prepared strips of alloy is then spread or laid out on a smooth, level table, and the aforementioned block of lead laid on this strip of alloy, which latter is then lapped over the former, so as to entirely cover it. Care must be taken to rub it smoothly, so as to prevent the formation of air-blisters or wrinkles. The strip of metal, as thus prepared, is then passed through a pair of highly-polished iron rollers, by heavy pressure, compelling the metals to unite evenly in one band of solid metal, having the alloy for the outer coating. This metal is self-soldering, that is, no solder is necessary to unite two pieces of the metal, it merely requiring the iron to be passed over them.

Second, I make an alloy of one hundred parts of lead, at least one half of one per cent. of zinc, copper, or brass, which makes the lead harder, stronger, and more durable than the lead of itself, or I use other metals, substantially the same, to produce the same result. A block of this alloy (No. 1) is then cast in a mould of any convenient and proper size, and passed through highly-polished iron rollers, and thus reduced, so as to become perfectly smooth throughout. I now prepare an alloy (No. 2) of one quarter tin, one quarter copper, one half of lead, more or less; or six parts tin and one of antimony; or fifty parts tin, four antimony, one bismuth; or fourteen parts tin, one twenty-eighth part zinc or copper, or one half of each of the latter; or pure tin, and alloy it with as much of one of the above-named metals, or any other, substantially the same, for the same purpose, in order only to give the tin more stiffness and durability than it has in its natural state. A block of this alloy (No. 2) is then also cast in a mould of suitable size. The block of alloy just cast is now passed through highly-polished iron rollers, and reduced to a thickness to answer the purpose of common plating; said thickness being from one to thirty-five per cent., more or less, of the original thickness of the block of alloy I intend to cover. One of the strips of alloy thus reduced is now spread out on a clean, smooth table. The block of alloy (No. 1) is then laid on this strip, and lapped over by the latter, so as to be entirely covered, and it must then be rubbed smoothly down so as to prevent the formation of air-blisters or wrinkles. This compound strip or block of metal is then passed through a pair of highly-polished iron rollers, having a heavy pressure, so that the strip or block of metal becomes evenly united into one solid mass, with its outer coating entirely of alloy. A block of the aforesaid tin or lead alloys is then cast in a mould of any size to suit my purpose, which block is passed through highly-polished iron rollers and reduced to thin strips or pieces, as desired.

I prepare a solution or bath of water (98° Fahrenheit) of ten gallons, (eighty pounds,) and one pound muriate or nitrate of tin, more or less. Any of the aforesaid strips of alloy-metal are now dipped in the above solution for the space of five to twenty minutes, more or less, when they will be found sufficiently covered with pure tin; they should then be polished or rubbed bright with a soft cloth or piece of leather. By this mode of covering my alloy with tin, any percentage of tin can be applied to it, and I therefore produce a metal equal in quality to the purest tin.

Among the numerous uses to which my invention can be applied are the following:

A sheet of the aforesaid metal, of proper size and thickness, is painted or coated with mixed paints or varnish, or paste composed of glue-water, starch, or other gum solution, and dry colors, or powdered brick-dust, or slate, or any powdered earthy substance. The metal is then covered or coated with this prepared color, and, when thoroughly dry, is passed through a pair of highly-polished rolls. The colors thus become firmly united with the metal. I thereby produce a beautiful metal, slate, or tile, or sheets of covered metal, which may be embossed, and answering many purposes. They may be employed as substitutes for tile, slate, etc., for steeples, towers, and other structures.

Tin-foil can readily be manufactured in the following manner:

The strips are cut in proper size, and formed into a pack thereof of twenty-five or fifty pieces, which pack is placed between suitable covers. This is then passed between highly-polished iron rollers until reduced to sheets of foil of intended thickness. This production is equal to foil of the purest tin, but is much cheaper.

The advantages I claim for my metal, when applied to roofing, are its superior quality, and that it is less expensive than the best materials now in use. It can be manufactured in large sheets, and therefore saves time and labor in applying it. It is non-corrosive, and does not require paint, and is in this respect less expensive. It is a good reflector of light and heat, by reason of its brightness. Persons occupying the upper stories of dwelling-houses, and other buildings, will not suffer in warm weather from heat that would arise from the use of other roofings. The same is also true of railroad-cars. It neither cracks nor breaks, by contraction or expansion from heat or cold. After having been in use in one place, it can be transferred to other buildings, or made use of elsewhere, or re-manufactured.

My metal may be printed, painted, photographed, lithographed, or otherwise configured or ornamented before the tin solution is applied. It will be necessary that the substances for said configuration or ornamentation be of such a nature as not to be affected by the solution. The whole surface will be tinned over, excepting the configuration or ornamentation, which remains untouched or uncovered by the solution.

The uses to which my metal may be applied are almost endless, especially to all articles hitherto made of lead and tin.

Having thus described my invention, what I claim as new, and desire to secure by Letters Patent, is—

The within-described article of metal, made from the metals, and of the proportions, and by the means, and in the manner substantially as specified.

To the above I have signed my name this twenty-first day of October, 1867.

JOHN D. GRÜNEBERG.

Witnesses:
   JOHN A. WIEDERSHEIM,
   WM. A. WIEDERSHEIM.